Figure 1:
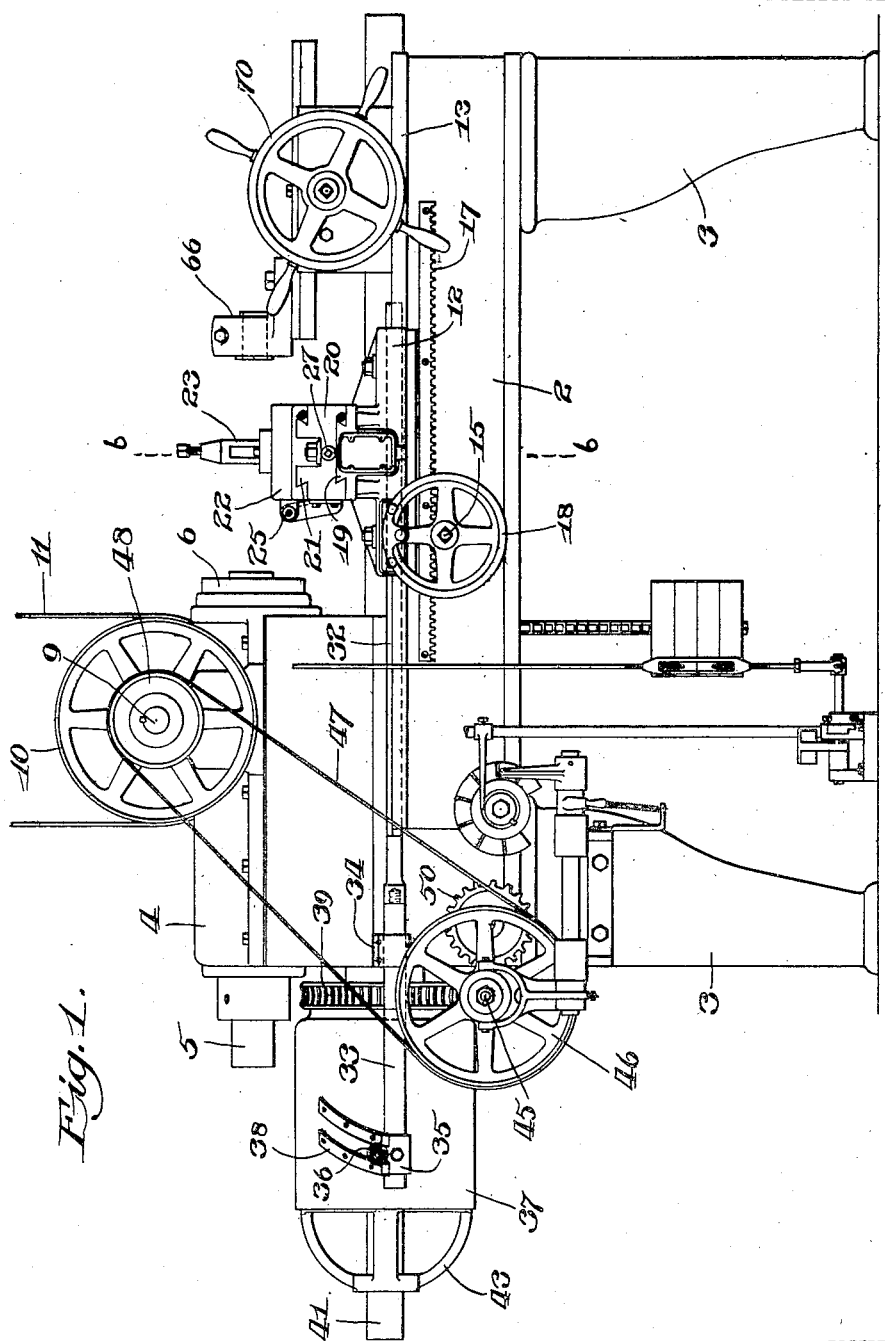

O. W. SCHAUM.
LATHE.
APPLICATION FILED FEB. 12, 1910.

1,042,149.

Patented Oct. 22, 1912.
4 SHEETS—SHEET 1.

WITNESSES:

INVENTOR
Otto W. Schaum
BY
H. V. Heaton, ATTORNEY.

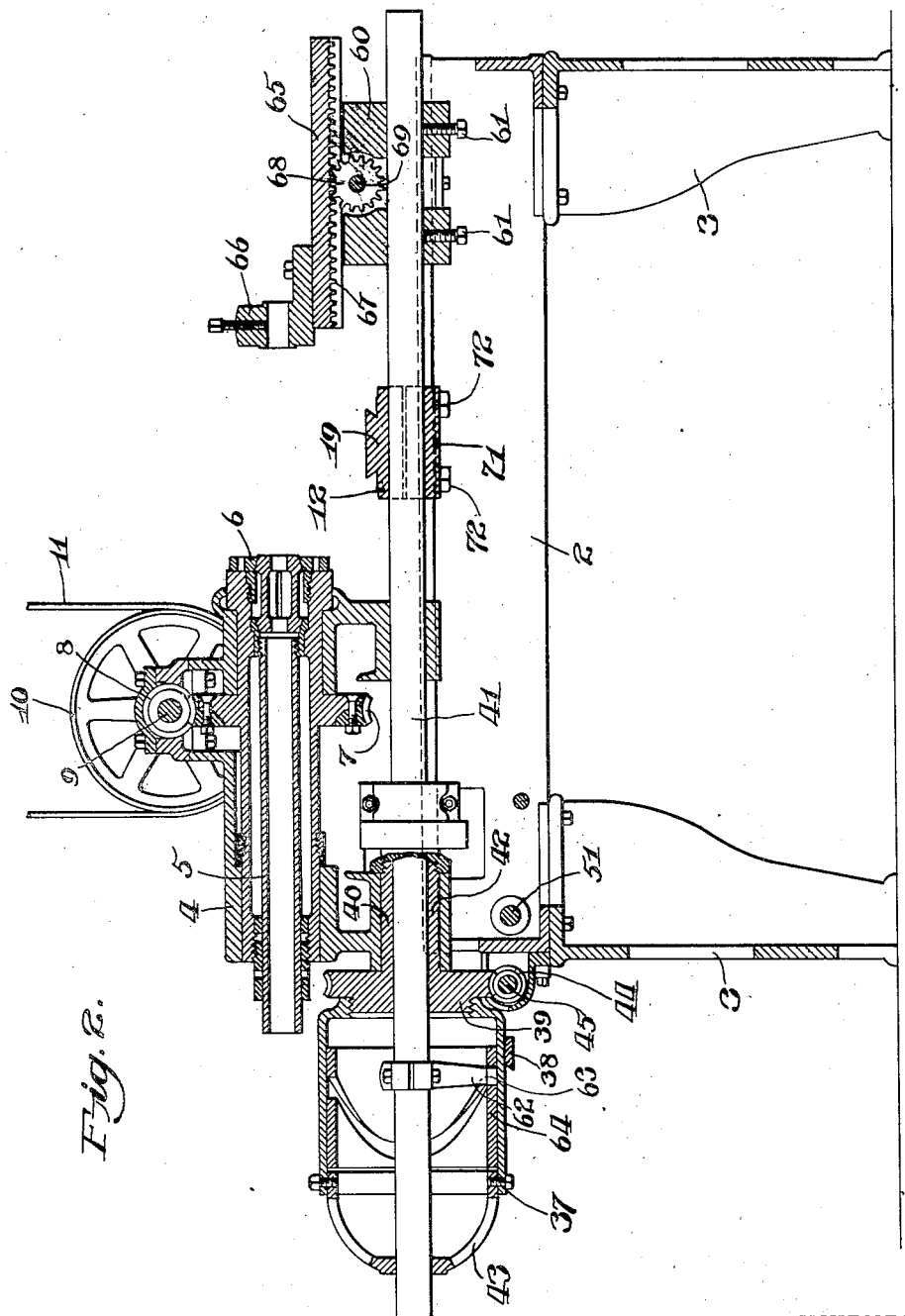

O. W. SCHAUM.
LATHE.
APPLICATION FILED FEB. 12, 1910.
1,042,149.
Patented Oct. 22, 1912.
4 SHEETS—SHEET 3.
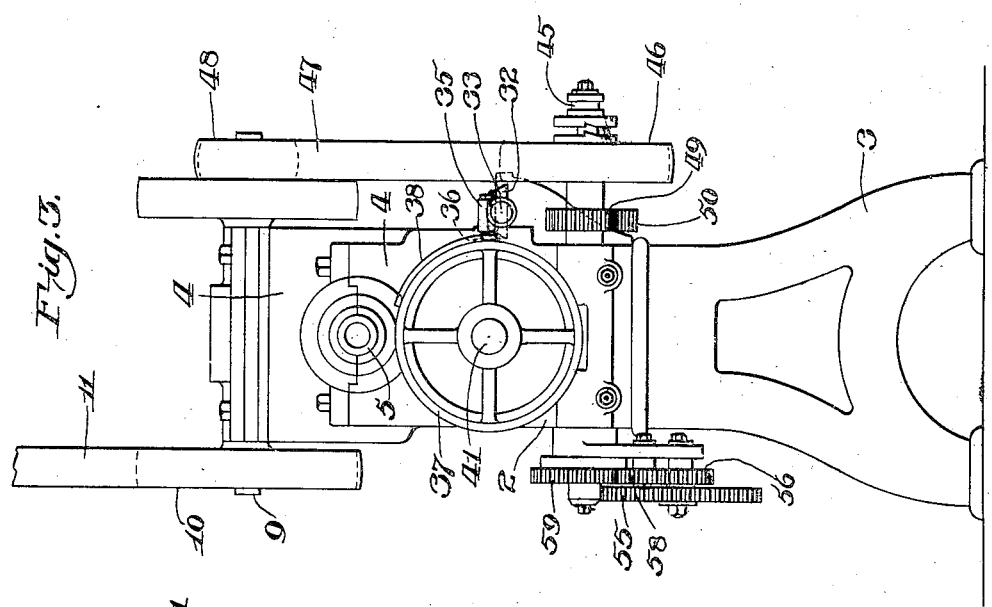
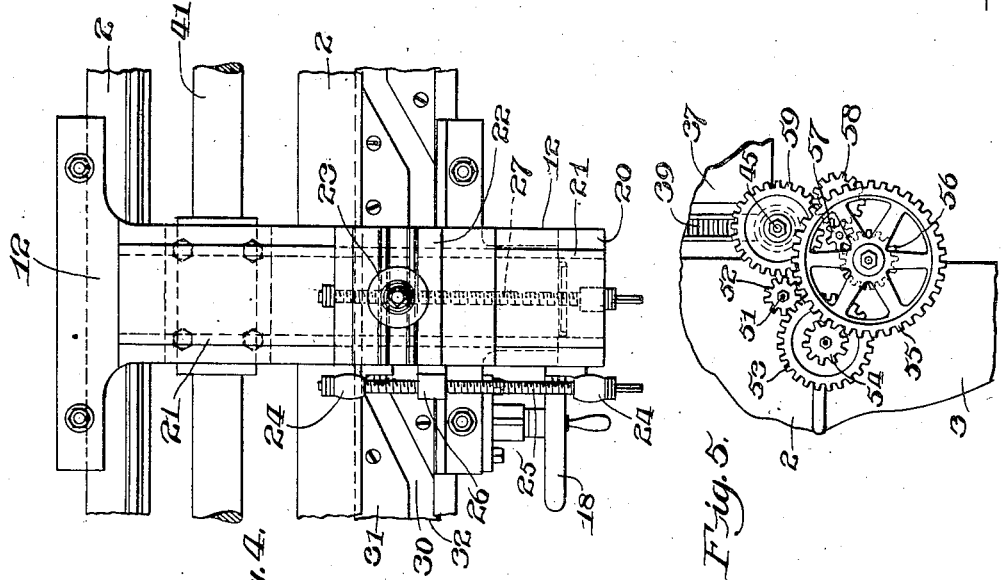
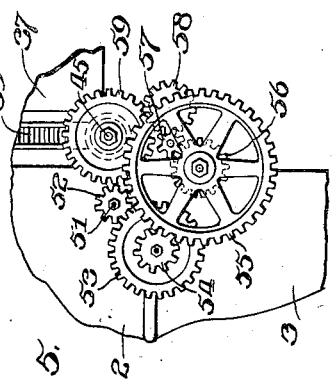
WITNESSES:
INVENTOR
Otto W. Schaum
BY
H. J. Henton, ATTORNEY.

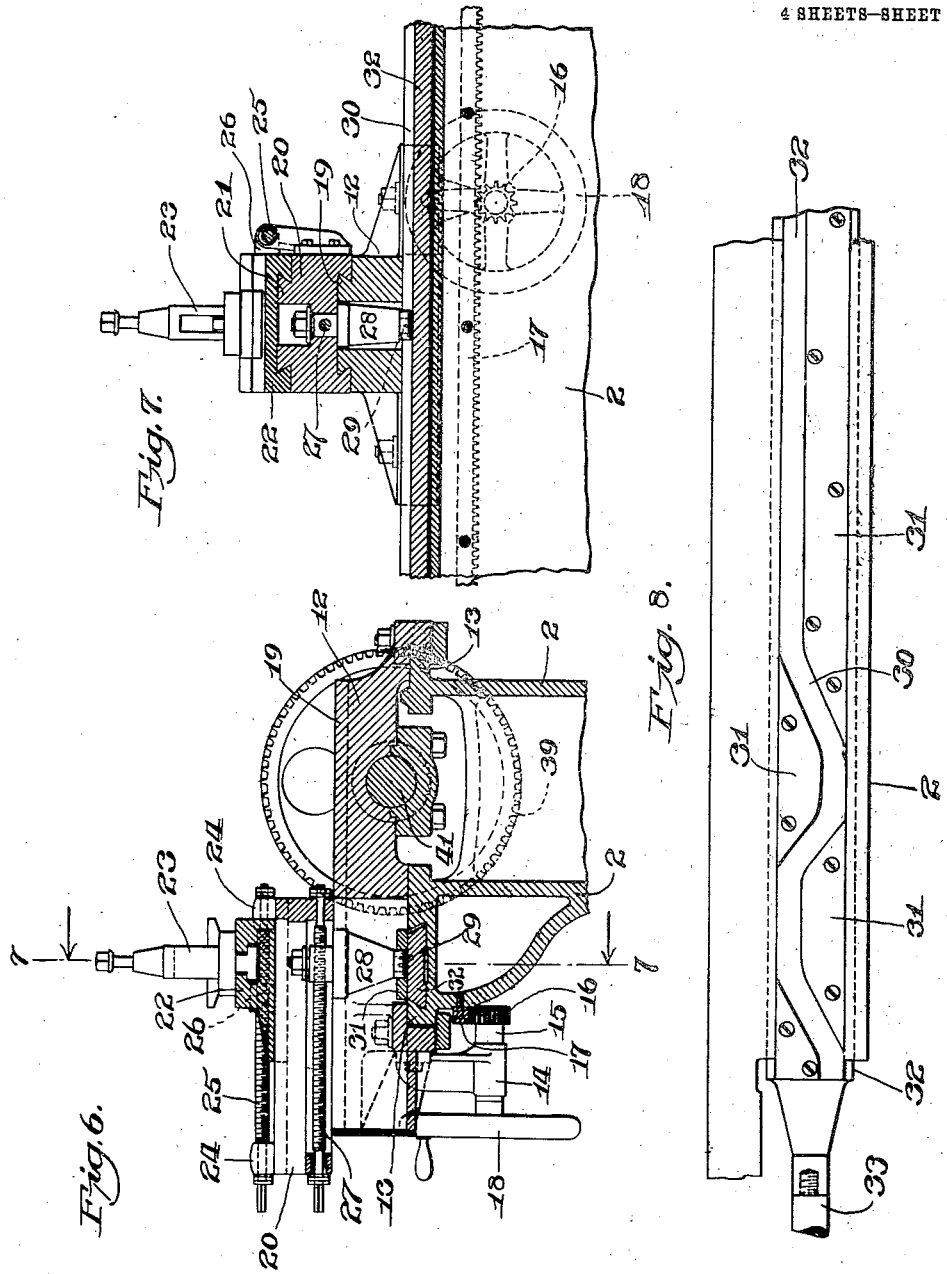

UNITED STATES PATENT OFFICE.

OTTO W. SCHAUM, OF PHILADELPHIA, PENNSYLVANIA, ASSIGNOR TO FAY MACHINE TOOL COMPANY, OF PHILADELPHIA, PENNSYLVANIA, A CORPORATION OF PENNSYLVANIA.

LATHE.

1,042,149.  Specification of Letters Patent.  Patented Oct. 22, 1912.

Application filed February 12, 1910. Serial No. 543,436.

*To all whom it may concern:*

Be it known that I, OTTO W. SCHAUM, a citizen of the United States, and resident of Philadelphia, in the State of Pennsylvania, have invented certain new and useful Improvements in Lathes, of which the following is a full, clear, and exact description, reference being had to the accompanying drawings, forming a part of this specification.

My invention relates to that class of machine tools commonly known as lathes, wherein are employed a rotatable shaft, a holder carried by the shaft and adapted to hold and rotate the work or blank to be treated, cutting tools movable relatively to the work holder and to each other, and means for moving the cutting tools to act upon the work or blank carried by the holder during the rotation thereof, whereby a multiplicity of operations may be simultaneously performed upon the same work or blank.

The object of my invention, as generally stated, is to provide a lathe of the class to which my invention relates, a novel, simple and efficient means for operating a tool holder relatively to the work holder during the rotation of the work holder to effect the cutting operation; and a further object of my invention is to provide a novel, simple and efficient means for adjusting or setting the tool holder relatively to its actuating mechanism and to the work holder.

The invention is adapted to be used in connection with the mechanism of the lathe disclosed in Letters Patent of the United States No. 910,466, dated January 19, 1909, to which reference may be had; and the invention may also be used in connection with other lathes of various kinds.

In the drawings:—Figure 1 is a side elevation of a lathe embodying my invention. Fig. 2 is a longitudinal vertical section thereof. Fig. 3 is an elevation of the left hand end of the machine. Fig. 4 is a plan view of a portion of the lathe bed, showing one of the tool holders and the adjustable supporting parts therefor. Fig. 5 is an elevation of a portion of the side frame of the machine opposite to the side shown in Fig. 1, showing the speed reducing gears. Fig. 6 is a vertical section on line 6—6 of Fig. 1. Fig. 7 is a vertical section on line 7—7 of Fig. 6. Fig. 8 is a plan view of a portion of the lathe bed, showing the longitudinally movable cam mounted therein.

The main frame of the lathe may be of any desired general construction, and as illustrated in the drawings it comprises the bed 2, and the supporting standards 3 therefor. Rising from one end of the bed 2 is a head stock 4 in which is mounted the rotatable lathe spindle 5. The inner end of the spindle 5 is provided with a chuck 6 or other suitable device adapted to receive and hold the work or blank to be acted upon by the cutting tools of the lathe, and cause the work or blank to be rotated by the spindle 5 while being acted upon by the cutting tools. The chuck or work holder 6 may be of any desired form to meet any desired requirements, and it may be modified to meet the various requirements of different blanks to be acted upon by the machine. Formed on or secured to the shaft or spindle 5 is a worm wheel 7 engaged by a worm 8 on the main driving shaft 9 which is mounted to rotate in suitable bearings on the head stock 4. The driving shaft 9 is provided with a pulley 10 driven by a belt 11 from an outside source of power. It will thus be seen that when the shaft 9 is rotated the worm 8 will slowly rotate the worm wheel 7 and therewith the shaft or spindle 5 carrying the work holder 6.

Mounted upon the bed 2 in front of the work holder 6 is a frame 12 which extends transversely across the bed and is fitted to slide thereon longitudinally of the machine and toward and from the work holder 6. The sides of the bed 2 are provided with projecting ribs 13 extending longitudinally of the machine and forming guides which are embraced by parts of the frame 12. The frame 12 is guided by the ribs 13 during its adjustment, and, as a suitable means for adjusting the frame 12 by hand toward and from the work holder 6, I provide the following:—Formed on or secured to one side of the frame 12 is a downwardly extending bracket 14 in which is journaled a short shaft 15 extending transversely of the machine. The inner end of the shaft 15 is provided with a gear wheel 16 adapted to engage a longitudinally extending gear rack 17 secured to the side of the bed 2. The outer end of the shaft 15 carries a suitable hand wheel 18 by means of which the shaft 15 may be turned, thereby causing the gear wheel 16 to engage the teeth of the rack 17 and move the frame 12 either toward or from the work holder 6, as desired. The frame or part 12 is provided on its upper face with a dove-tail projection 19 forming guiding faces which extend transversely of the axis of rotation of the work holder 6; and mounted upon the frame 12 and fitted to the dove-tail projection 19 is a carriage 20 movable transversely of the axis of rotation of the spindle 5 and guided by the dove-tail projection.

The carriage 20 is provided on its upper face with a dove-tail projection 21 forming guiding faces which extend parallel to the guiding faces of the dove-tail projection 19 and transversely of the axis of rotation of the work holder 6; and mounted upon the carriage 20 and fitted to the dove-tail projection 21 is a second carriage 22 movable transversely of the axis of rotation of the spindle 5 and guided by the dove-tail projection 21. The carriage 22 is provided with a suitable tool holder 23 adapted to receive and firmly hold a cutting tool. Mounted in bearings 24 on the ends of the carriage 20 is a screw-threaded shaft 25 which extends parallel to the dove-tail projection 21 and is screwed into and through a projection 26 on the carriage 22. The outer end of the shaft 25 extends beyond the outer bearing 24 and is made square as shown, to permit the application thereto of a wrench or other suitable tool to turn the shaft for the purpose of adjusting the carriage 22 transversely of the machine with respect to the carriage 20. Extending through a central opening in the carriage 20 is a screw-threaded shaft 27 which extends parallel to the dove-tail projection 19 and is screwed into and through a block 28. The shaft 27 is mounted to turn in suitable bearings in the carriage 20, and the outer end of the shaft 27 extends beyond the carriage and is made square as shown, to permit the application thereto of a wrench or other tool to turn the shaft for the purpose of adjusting the carriage 20 transversely of the machine with respect to the block 28 and frame 12.

The block 28 is arranged within an opening in the frame 12 and is movable in said opening transversely of the machine. The lower end of the block 28 is provided with a roller 29 arranged on a vertical axis and within a cam slot 30 formed between cams 31 on a slide plate or bar 32 extending longitudinally of the machine and at right angles to the dove-tail projections 19 and 21. The slide or bar 32 is made dove-tail shape in cross section, and is fitted to a similarly shaped guideway formed in the top of one side of the bed 2, whereby the cam bar 32 may be guided and moved longitudinally.

Projecting fixedly from one end of the cam bar 32 is a rod or shaft 33 which extends through a bearing 34 on the main frame or bed 2. This rod 33 is provided with a collar or bracket 35 carrying a roller 36 arranged adjacent the outer face of a hollow rotatable cam carrier or cylinder 37, the outer face of which is provided with suitable cams 38 adapted to engage the roller 36 and moves the cam bar 32 longitudinally of the machine in either direction during the rotation of the cam carrier 37. The cam carrier 37 is formed on or secured to a worm wheel 39 provided with a hub or sleeve 40 which surrounds a shaft 41 and is mounted to rotate in a bearing 42 on the main frame of the machine. The outer end of the cam carrier 37 is provided with a suitable brace 43 which surrounds the shaft 41. The worm wheel 39 is engaged by a worm 44 fixed to a transverse shaft 45 which is mounted in suitable bearings on the main frame. Loosely mounted on the shaft 45 is a pulley 46 driven by a belt 47 from a pulley 48 on the main shaft 9. The shaft 45 may be actuated direct from the pulley 46 or it may be actuated through a set of speed-reducing gears as follows:

Formed on or secured to the hub of the pulley 46 is a pinion 49 which coacts with a gear wheel 50 on one end of a shaft 51 which extends transversely through the bed 2 of the machine and is journaled in bearings therein. The other end of the shaft 51 is provided with a pinion 52 coacting with a gear wheel 53 the hub of which carries a pinion 54 which coacts with a gear wheel 55. The hub of the gear wheel 55 is provided with a gear wheel 56 coacting with a pinion 57. This pinion 57 coacts with a gear wheel 58 which in turn coacts with a gear wheel 59 secured to the shaft 45.

It will thus be seen that during the actuation of the pulley 46 from the main driving shaft 9, the shaft 45 and worm 44 will be slowly rotated, thereby slowly rotating the worm wheel 39 and therewith the cam carrier 37, causing the cams 38 to move the cam bar 32 longitudinally of the machine and the cams 31 to move the carriage 20 transversely of the machine.

Referring to Figs. 7 and 8, it will be observed that the sides of the upper portion of the block 28 are fitted in contact with the side walls of the central opening through which the shaft 27 extends in the carriage 20, and that the lower portion of the block 28 is out of contact with the side walls of the opening in which the block is arranged in the frame 12. This construction holds the carriage 20 and block 28 in proper relation to each other when the carriage 20 is adjusted on the frame 12 by the shaft 27 or under the influence of the cam 32, and permits the carriage 20 to be adjusted without friction between the block 28 and frame 12.

The shaft 41 extends longitudinally of the machine and through the frame 12 between the main body thereof and a block 71 secured to the body of the frame 12 by suitable screws 72. By tightening the screws 72 the frame 12 may be secured to the shaft 41 to be moved thereby, and by loosening the screws 72 the shaft 41 may be permitted to slide freely through the frame. Secured to the shaft 41 within the hollow cam carrier 37 is an arm 62 carrying a roller 63. This roller 63 is arranged adjacent the inner wall of the cam carrier 37 and is adapted to be acted upon by cams 64 to move the shaft 41 longitudinally of the machine. It will thus be seen that when the frame 12 is secured to the shaft 41, the frame 12, and therewith the carriage 20 carrying the tool holder 23, will be moved longitudinally of the machine under the influence of the cams 64.

From the construction hereinbefore described, it will be seen that the cam carrier 37 will be automatically rotated from the main shaft 9 during the rotation of the work holder 6. It will also be seen that during the rotation of the cam carrier 37 the tool holder 23 may be moved by the frame 12 under the influence of the cams 64, longitudinally of the axis of rotation of the work holder 6, or the tool holder 23 may be moved by the carriage 20 under the influence of the cams 31 and 38, transversely of said axis, or the tool holder may be given a compound movement under the influence of the cams 31, 38 and 64, the compound movement being the resultant of the longitudinal movement of the frame 12 and the transverse movement of the carriage 20. By changing the cams 31, 38 and 64, any desired movements may be given to the frame 12 and carriage 20 relatively to each other and to the work holder 6.

An important feature of my invention is the construction and arrangement of the parts for supporting and controlling the tool holder 23, whereby a tool carried thereby may be rigidly maintained in cutting engagement with the work being treated during the movement of the tool holder. In setting the tool holder 23 in proper position for the performance of any particular operation upon the work carried by the work holder 6, a wide range of adjustment may be given to the tool holder 23, not only by the operation of the hand wheel 18 to effect the adjustment of the tool holder longitudinally of the machine before the frame 12 is secured to the shaft 41, but also by the manipulation of one or both of the screw-threaded shafts 25 and 27 to adjust the tool holder 26 transversely of the axis of rotation of the work holder 6. By providing for the adjustment of the two carriages 20 and 22 relatively to each other and to the frame 12, I provide a wide range of adjustment for the tool holder 23 transversely of the axis of rotation of the work holder 6.

The shaft 41 extends through a carriage 60 which is mounted upon suitable guides on the bed in a manner to be movable thereon longitudinally of the machine toward and from the work holder 6, the carriage 60 being secured to the shaft 41 by suitable screws 61. When the screws 61 are tightened against the shaft 41 the carriage 60 will be moved by the shaft 41 longitudinally of the machine under the influence of the cams 64.

The carriage 60 is provided with guides extending longitudinally of the machine parallel to the shaft 41 and fitted to these guides is a second carriage 65 which is longitudinally movable with respect to the carriage 60. The carriage 65 is provided with a suitable tool holder 66 adapted to receive and hold a cutting tool. The under side of the carriage 65 is provided with a longitudinally extending gear rack 67 which is engaged by the teeth of a gear wheel 68 on a transverse shaft 69. The shaft 69 extends through and is mounted to turn in one of the side walls of the carriage 60. The outer end of the shaft 69 is provided with a suitable hand wheel 70 by means of which the shaft may be turned to turn the gear wheel 68 and cause it to engage the rack 67 to adjust the carriage 65 and therewith the tool holder 66 longitudinally of the machine with respect to the carriage 60.

When it is desired to operate the frame 12 carrying the tool holder 23 by the shaft 31 without operating the carriage 60 carrying the tool holder 66, the screws 61 may be loosened to permit the carriage 60 to remain idle; and when it is desired to operate either the carriage 60 or the carriage 20 carrying the tool holder 23 or both without operating the frame 12, the screws 72 may be loosened to permit the frame 12 to remain idle. Thus it will be readily understood that many different operations may be performed upon the work or blank being treated by the tools carried by the tool holders 23 and 66.

In the form of embodiment of the invention shown and described herein, the shaft 45 and its coacting mechanism is precisely like the shaft "18" and the actuating mechanism therefor of the machine shown and described in U. S. Letters Patent No. 910,466, hereinbefore referred to; and when the invention is used in connection with a machine of the character shown and described in said Letters Patent, the stop motion shown and described therein may be employed to automatically stop the operation of the lathe after one or both of the cutting tools carried by the tool holders 23 and 66 have performed their operations upon the work.

I claim:—

1. In a lathe, the combination of a support, a work holder, means for rotating the work holder, a frame mounted on said support and movable parallel to the axis of rotation of the work holder and provided with guiding faces extending transversely of said axis, a carriage fitted to said guiding faces and having an opening therein extending parallel to said guiding faces, a tool holder carried by the carriage, a block slidably fitted to the walls of said opening, means operative to adjust said carriage relatively to said block, a longitudinally movable cam operatively connected to said block, and means for moving said cam.

2. In a lathe, the combination of a support, a work holder, means for rotating the work holder, a frame mounted on said support and movable parallel to the axis of rotation of the work holder and provided with guiding faces extending transversely of said axis and having an opening therein extending parallel to said guiding faces, a carriage fitted to said guiding faces, a tool holder carried by the carriage, a block located within said opening, means operative to adjust said carriage relatively to said block, a longitudinally movable cam guided by said support beneath said frame and operatively connected to said block, and means for moving said cam.

3. In a lathe, the combination of a support, a work holder, means for rotating the work holder, a frame mounted on said support and movable parallel to the axis of rotation of the work holder and provided with guiding faces extending transversely of said axis and having an opening therein extending parallel to said guiding faces, a carriage fitted to said guiding faces and having an opening therein extending parallel to said guiding faces, a tool holder carried by the carriage, a block located within said openings and slidably fitted to the walls of the opening in said carriage, means operative to adjust said carriage relatively to said block, a longitudinally movable cam guided by said support beneath said frame and operatively connected to said block, and means for moving said cam.

In testimony whereof, I have hereunto affixed my signature this 27th day of January A. D. 1910.

OTTO W. SCHAUM.

Witnesses:
A. M. BIDDLE,
R. A. DUNLAP.